(12) United States Patent
Bates et al.

(10) Patent No.: US 6,360,360 B1
(45) Date of Patent: *Mar. 19, 2002

(54) OBJECT-ORIENTED COMPILER MECHANISM FOR AUTOMATICALLY SELECTING AMONG MULTIPLE IMPLEMENTATIONS OF OBJECTS

(75) Inventors: Cary Lee Bates; Edward Curtis Prosser; William Jon Schmidt, all of Rochester, MN (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/598,360

(22) Filed: Feb. 8, 1996

(51) Int. Cl.$^7$ .................................. G06F 9/45
(52) U.S. Cl. ........................................... 717/9
(58) Field of Search ................ 395/704, 705; 717/5–10; 709/330; 707/102, 103

(56) References Cited

U.S. PATENT DOCUMENTS

| | | | | |
|---|---|---|---|---|
| 5,481,716 A | * | 1/1996 | Morshedi et al. | 717/2 |
| 5,495,571 A | * | 2/1996 | Corrie, Jr. et al. | 714/38 |
| 5,530,964 A | * | 6/1996 | Alpert et al. | 395/708 |
| 5,787,275 A | * | 7/1998 | Li | 707/103 |
| 5,787,285 A | * | 7/1998 | Lanning | 395/704 |
| 5,864,864 A | * | 1/1999 | Lerner | 707/102 |
| 5,999,987 A | * | 12/1999 | O'Farrell et al. | 709/330 |

OTHER PUBLICATIONS

Grove et al, Profile–Guided Receiver Class Prediction, OOPSCA '95, ACM p. 108–123.*

* cited by examiner

Primary Examiner—St. John Courtenay, III
(74) Attorney, Agent, or Firm—Martin & Associates, LLC; Derek P. Martin (57) ABSTRACT

In an object-oriented or object-based computer system, a compiler mechanism allows a compiler to automatically select among multiple implementations of an object to optimize the performance of the compiled code. The selection may be made by assigning a weighted cost to each of the implementations, and selecting the implementation with the lowest weighted cost, where the weighted cost represents estimates of execution frequencies for each of the object's functions. In the alternative, for implementations that have different interfaces, the selection may be made based on an evaluation of the functions used in the program compared to the functions provided by the different implementations, and selecting an implementation that contains all functions issued against the object with a minimum of functions that are not issued against the object.

29 Claims, 5 Drawing Sheets

OBJECT-ORIENTED COMPILER MECHANISM FOR AUTOMATICALLY SELECTING AMONG MULTIPLE IMPLEMENTATIONS OF OBJECTS

FIELD OF THE INVENTION

This invention generally relates to computer systems. More specifically, this invention relates to an object-oriented method and apparatus for automatically selecting among multiple implementations of objects in a computer program.

BACKGROUND OF THE INVENTION

The development of the EDVAC computer system of 1948 is often cited as the beginning of the computer era. Since that time, computer systems have found their way into just about every aspect of the American lifestyle. One reason for this proliferation is the ability of computer systems to perform a variety of tasks in an efficient manner. The mechanisms used by computer systems to perform these tasks are called computer programs.

Like computer systems themselves, the development of computer programs has evolved over the years. The EDVAC system used what was called a "one address" computer programming language. This language allowed for only the most rudimentary computer programs. By the 1960s, improvements in computer programming languages led to computer programs that were so large and complex that it was difficult to manage and control their development and maintenance.

Therefore, the focus of the 1970s was on developing programming methodologies and environments that could better accommodate the increasing complexity and cost of large computer programs. One such methodology is called Object Oriented Programming (OOP). Though it has been some time since the fundamental notions of OOP were first developed, OOP systems are becoming more and more prevalent because it is felt that use of OOP can greatly increase the efficiency of computer programmers. Not surprisingly, objects are central to OOP technology. A single object represents an individual operation or a group of operations that are performed by a computer system upon information controlled by the object. Objects can be thought of as autonomous agents that work together to perform certain tasks. Sometimes entire computer programs are made up of groupings of objects and sometimes objects are simply accessed by more traditional computer programs to perform one specific task or subtask. For a general background regarding objects and object-oriented programming, see Grady Booch, *Object Oriented Design with Applications,* (Benjamin/Cummings Publishing Co. 1991).

While the use of OOP has led to greater programmer efficiency, that same use brings with it several challenges that have yet to be overcome by prior art mechanisms. For example, the specific programming (i.e., implementation) of an object will determine the performance of that object. While one implementation of an object may be optimized for a particular portion of the computer program, that same implementation of the object may be inefficient for a different portion of the computer program. Thus, by using only a single way to implement an object, the performance of a computer program that uses the object will not be optimized.

Programmers have recognized the need to provide multiple implementations of objects to provide a choice of different implementations according to different performance requirements and design parameters of the computer program. For example, one implementation of an object may store data in an array. Storing data in an array is a relatively efficient use of memory provided that the approximate number of items to be stored is known. However, to retrieve a particular piece of data from the array, the array must be searched until the desired piece of data is located. As a result, the slower speed of retrieving a particular piece of data from the array is a trade-off for the memory efficiency of the array. In contrast, a different implementation of the same object may use a hash table instead of an array. A hash table uses memory less efficiently, but has the advantage of quick retrieval of any particular piece of data. In one portion of a computer program, speed may be a primary concern, so the implementation that uses the hash table would be preferred. In another portion of the computer program, memory usage may be a primary concern, so the implementation that uses the array would be preferred. However, in the past, the selection between multiple implementations of objects was performed manually, with the programmer specifically selecting a particular implementation for each object in the computer program, or for only certain objects. This process of manually selecting between multiple implementations of objects is very time-consuming and inefficient. Without a mechanism for automatically selecting among multiple implementations of objects without programmer intervention, the efficiency of computer programs will be impaired, resulting in less than optimal performance from computers running these computer programs.

SUMMARY OF THE INVENTION

According to the present invention, a mechanism allows a compiler to automatically select among multiple implementations of objects. In accordance with a first embodiment, the compiler uses a weighted cost function for each implementation to determine which implementation is most advantageous for a given object based on an estimate of execution frequency of each function of the object. In accordance with a second embodiment, the compiler uses information relating to the functions issued against a given object to select an implementation with the most efficient interface that contains all the issued functions.

The foregoing and other objects, features and advantages of the invention will be apparent from the following more particular description of preferred embodiments of the invention, as illustrated in the accompanying drawings.

BRIEF DESCRIPTION OF THE DRAWINGS

The preferred exemplary embodiments of the present invention will hereinafter be described in conjunction with the appended drawings, where like designations denote like elements, and.

DESCRIPTION OF THE PREFERRED EMBODIMENTS

Overview
Object Oriented Technology

As discussed in the Background section, objects can be thought of as autonomous agents that work together to perform the tasks required by a computer system. A single object represents an individual operation or a group of operations that are performed by a computer system upon information controlled by the object. The operations of objects are called "methods" or "functions," and the information controlled by objects is called "object data" or just "data." Objects are created (i.e., "instantiated") as members of something called a "class." A class is used to define its members. Classes define the data that will be controlled by their member objects and the functions or methods that their member objects will have to provide access to that data. Thus, when discussing multiple implementations of objects, each different implementation is represented by a corresponding class definition that determines the particular implementation of objects instantiated under that class. For the discussion herein, the functions or methods of an object are generically referred to as "functions." In addition, while objects have specific definitions with regard to object-oriented programming, the term "object" as used in this specification encompasses not only the common OOP notion of an object, but equally encompasses other "objects" in a computer program that may be object-based rather than object-oriented, or that may be other portions of code in a procedural language, such as procedures or functions. In sum, an "object" as used herein is a generic term for any portion of code that has functions and corresponding data upon which the functions operate.

Statements, Instructions, Compilers

Computer programs are constructed using one or more programming languages. Like words written in English, a programming language is used to write a series of statements that have particular meaning to the drafter (i.e., the programmer). The programmer first drafts a computer program in human readable form (called source code) prescribed by the programming language, resulting in a source code instruction (or statement) stream. The programmer then uses mechanisms that change the human readable form of the computer program into a form that can be understood by a computer system (called machine readable form, or object code). These mechanisms are typically called compilers; however, it should be understood that the term "compiler," as used herein, refers to any mechanism for converting one form of a computer program to another form, specifically for converting one instruction stream (e.g., source code) to a different instruction stream (e.g., object code). Compilers have greatly simplified the process of generating computer programs by providing the capability for a programmer to write source code in a high level language, making the resultant source code more easily understood and maintained by the programmer.

A compiler may reside within the memory of the computer which will be used to execute the object code, or may reside on a separate computer system. Compilers that reside on one computer system and are used to generate machine code for other computer systems are typically called "cross compilers." The methods and apparatus discussed herein apply to all types of compilers, including cross compilers.

Known Programming Techniques

Figure 2:
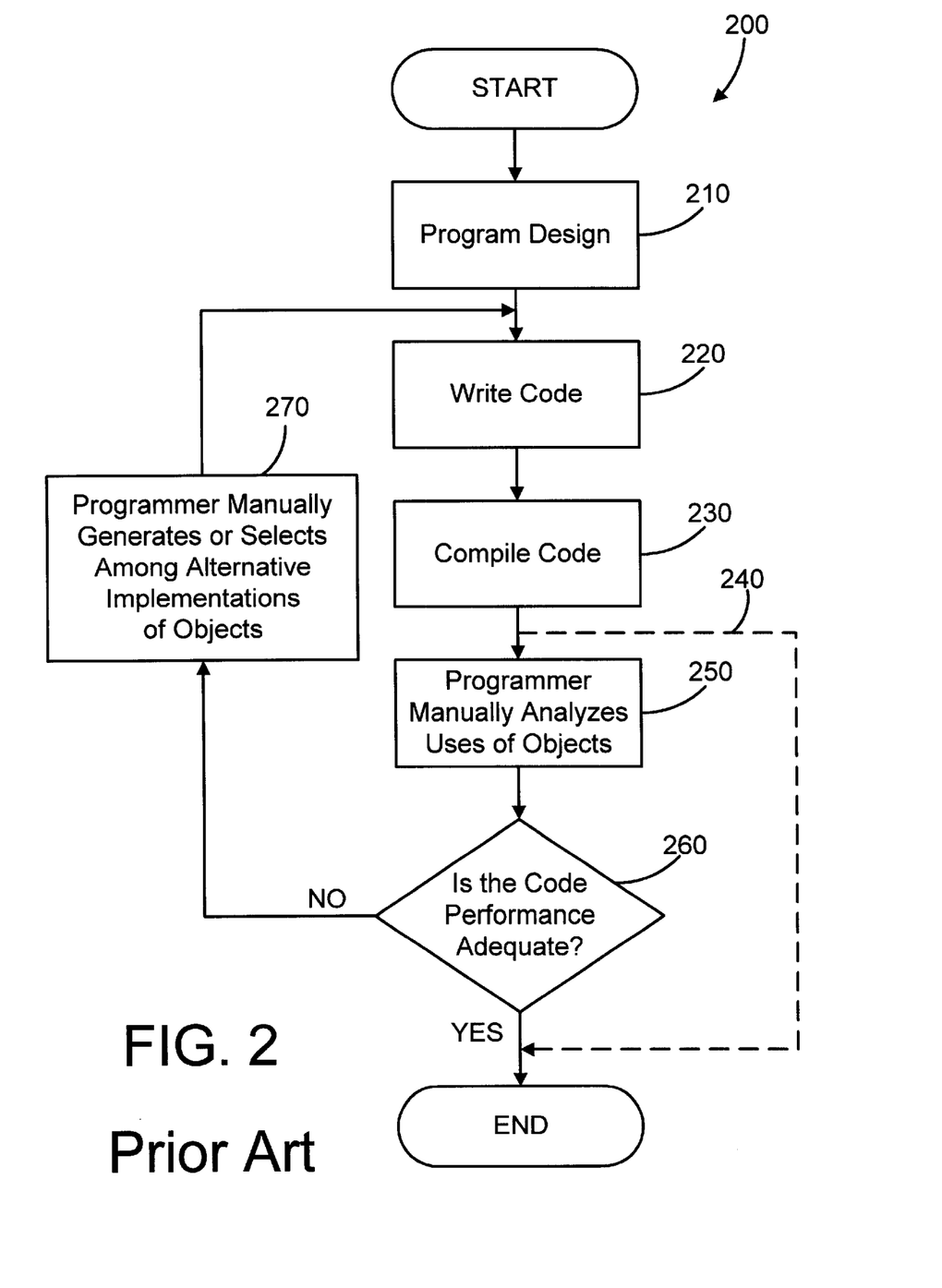
FIG. 2 is a flow diagram illustrating prior art methods for software development.

The proliferation of compilers has changed how a computer programmer writes a computer program. In the early days of computers, programmers initially programmed in machine code, which is a numerical sequence understandable by the computer. Soon assembly code was developed, which was a human-readable representation of machine code with a one-to-one correspondence between assembly code instructions and machine code instructions. An assembler was used to translate the assembly code into machine code. With the advent of high level languages, compilers became prevalent. Referring to FIG. 2, a prior art computer program development method 200 using a compiler includes the steps of designing the computer program (step 210), writing code (step 220) in a high level language, and compiling the code (step 230). With early compilers, the compilation step 230 would be the end of the programming procedure (path 240).

One of the indicators of good object-based or object-oriented design is that the objects involved have an interface that allows the designer to completely reimplement the objects without affecting any other part of the computer program. However, it is often the case that an implementation of an object that performs well for one usage may not be the best implementation for all usages. Thus, to optimize an object-oriented or object-based computer program, different implementations of objects (i.e., class definitions) are needed according to the varying performance parameters of the code.

With the proliferation of OOP and the desire to further enhance the performance of compiled code, additional steps were introduced into programming method 200 Specifically, once the code was compiled (step 230), the programmer could manually analyze how objects were used in the computer program (step 250). If the code performance was adequate (step 260=YES), the compiled code could be used without further modification. If, however, the code performance was inadequate (step 260=NO), the programmer would manually determine which objects within the computer program needed to be improved, and would then manually generate an alternative implementation of the object (step 270) Note that if the programmer had resources available produced by the programmer or others, the programmer might instead simply select among existing alternative implementations of the object (step 270). In short, any improvement to compiled code required the programmer to determine which objects needed improvement (step 250), and to either generate or select an alternative implementation (step 270).

One method of determining which objects needed improvement (step 250) is for the programmer to manually evaluate a program listing. Another known method uses profiling. Profiling is a process whereby a compiler generates test code that is representative of the compiled computer program. The test code may have additional instrumentation code to record the performance of the code (e.g., the number of times a loop is executed, the number of times a branch is taken, etc.) A computer executing the test code may then generate a report indicating the performance characteristics for each object. In the alternative, profiling may be done without instrumentation code by providing an address trace from a piece of test equipment that monitors the addresses that are being executed in the test code. These are two suitable methods of deriving dynamic profiling information, and are described as specific implementations of the general concept of dynamic profiling. One skilled in the art will recognize that other forms of dynamic profiling are possible, and any form of dynamic profiling is within the scope of the present invention. Regardless of how the profiling data is generated, the programmer must still manually analyze the performance data (step 250) to determine which of the objects should be selected for alternative implementations.

Mechanisms of the Present Invention

The apparatus and method in accordance with the present invention allow a programmer to define multiple implementations of a class with varying performance characteristics, and allow a compiler to automatically select among these multiple implementations according to the performance characteristics of the computer program at the point where the object is instantiated, as described below.

DETAILED DESCRIPTION

Figure 1:
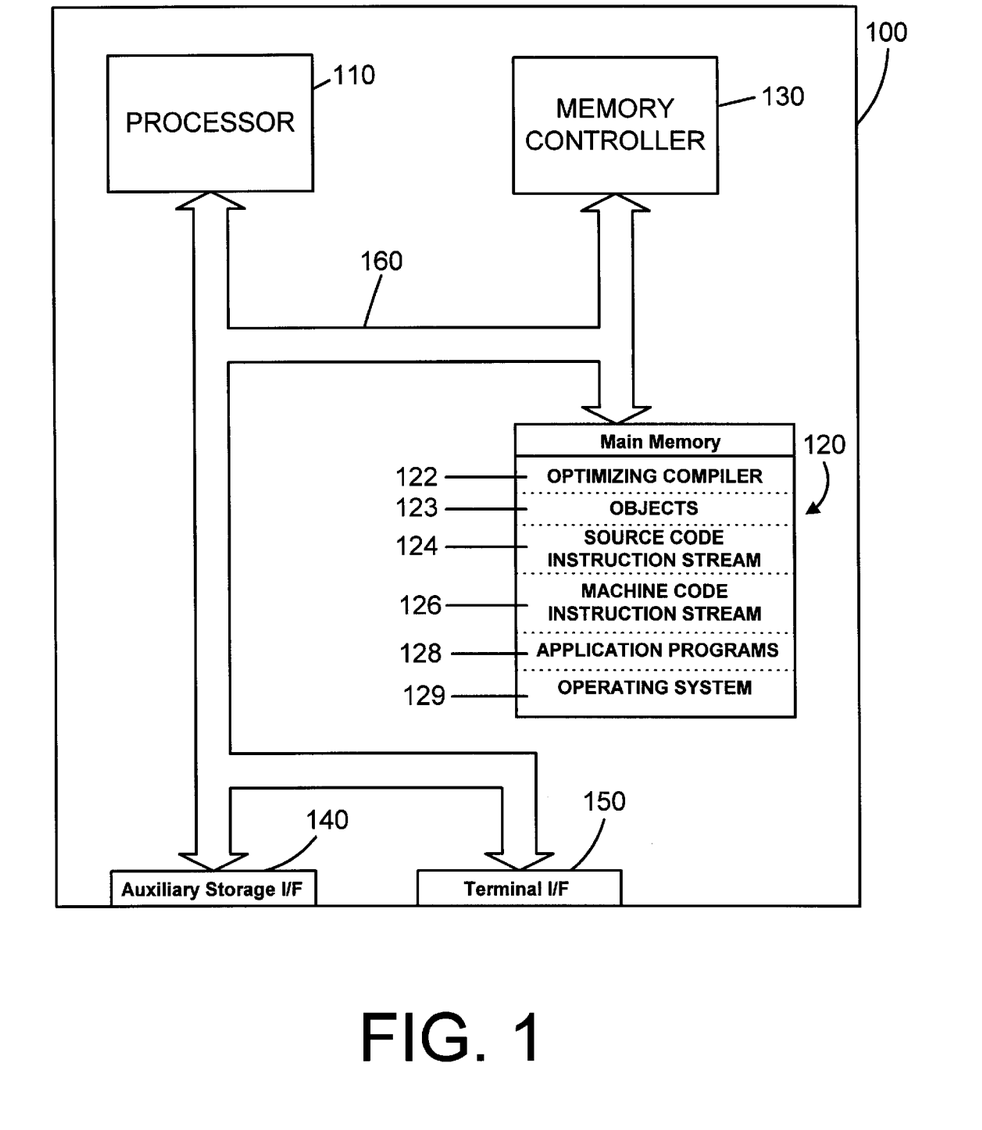
FIG. 1 is a block diagram of a computer system in accordance with the present invention.

Referring to FIG. 1, a computer system 100 in accordance with the present invention is an enhanced IBM AS/400 mid-range computer system. However, those skilled in the art will appreciate that the mechanisms and apparatus of the present invention apply equally to any computer system, regardless of whether the computer system is a complicated multi-user computing apparatus or a single user device such as a personal computer or workstation. Computer system 100 suitably comprises a processor 110, main memory 120, a memory controller 130, an auxiliary storage interface 140, and a terminal interface 150, all of which are interconnected via a system bus 160. Note that various modifications, additions, or deletions may be made to the computer system 100 illustrated in FIG. 1 within the scope of the present invention such as the addition of cache memory or other peripheral devices; FIG. 1 is presented to simply illustrate some of the salient features of computer system 100.

Processor 110 performs computation and control functions of computer system 100, and comprises a suitable central processing unit. Processor 110 may comprise a single integrated circuit, such as a microprocessor, or may comprise any suitable number of integrated circuit devices and/or circuit boards working in cooperation to accomplish the functions of a processor. Processor 110 suitably executes a machine code instruction stream 126 within main memory 120.

Auxiliary storage interface 140 is used to allow computer system 100 to store and retrieve information from auxiliary storage, such as magnetic disk (e.g., hard disks or floppy diskettes) or optical storage devices (e.g., CD-ROM). Memory controller 130, through use of a processor separate from processor 110, is responsible for moving requested information from main memory 120 and/or through auxiliary storage interface 140 to processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Terminal interface 150 allows system administrators and computer programmers to communicate with computer system 100, normally through programmable workstations. Although the system 100 depicted in FIG. 1 contains only a single main processor 110 and a single system bus 160, it should be understood that the present invention applies equally to computer systems having multiple processors and multiple system buses. Similarly, although the system bus 160 of the preferred embodiment is a typical hardwired, multidrop bus, any connection means that supports bidirectional communication could be used.

Main memory 120 contains optimizing compiler 122, objects 123, source code instruction stream 124, machine code instruction stream 126, application programs 128, and operating system 129. While objects 123 are shown as residing in main memory 120 independent from the other portions stored in main memory, objects 123 are shown separately for the convenience of illustrating the general concept of objects stored in a computer system memory. In reality, objects (such as 123 of FIG. 1) may reside within optimizing compiler 122, within source code instruction stream 124, within machine code instruction stream 126, within application programs 128, and/or within operating system 129. Each of these software programs stored in main memory 120 may contain objects. Note, however, that the objects of particular concern herein are the objects that are a part of source code instruction stream 124, and that eventually become implemented in machine code instruction stream 126 by compiler 122. It should be understood that main memory 120 will not necessarily contain all parts of all mechanisms shown. For example, portions of application programs 128 and operating system 129 may be loaded into an instruction cache (not shown) for processor 110 to execute, while other files may well be stored on magnetic or optical disk storage devices (not shown). In addition, compiler 122 may generate a machine code instruction stream 126 that is intended to be executed on a different computer system if compiler 122 is a cross-compiler.

The remainder of this specification describes how the present invention improves the performance of computer system 100 by providing a mechanism which allows compiler 122 to automatically select among different implementations of objects (i.e., class definitions) during the compilation of the computer program. For the discussion herein, it is assumed that multiple class definitions for objects already exist, and are available to the compiler. In the case of an object-oriented design, classes may be alternative implementations if they are subclasses to a common class definition. In the case of an object-based design, alternative class implementations may be given the same name so the compiler can identify these as alternatives. Those skilled in the art will appreciate that the present invention applies equally to any compiler.

Figure 3:
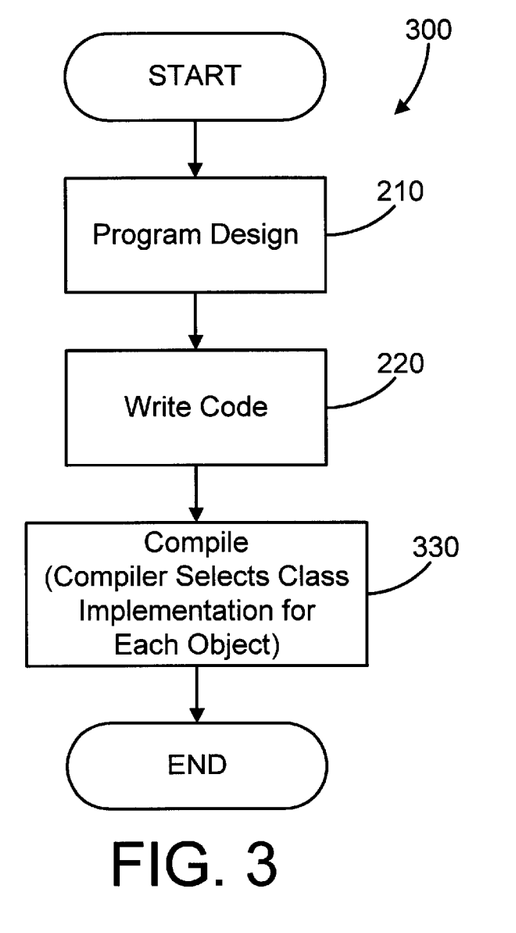
FIG. 3 is a flow diagram of a programming method in accordance with the present invention.

Referring to FIG. 3, a computer program development method 300 in accordance with the present invention includes the steps of designing the program (step 210) and writing code (step 220), the same steps that were performed in known method 200 and discussed in reference to FIG. 2. Note, however, that programming method 300 includes a new compilation step 330, during which the compiler analyzes the performance of each object and automatically selects among multiple implementations (i.e., class definitions) for each object that produces the best results for that object. In the preferred embodiments disclosed herein, the performance of each object in the code is analyzed, and an implementation is selected for each object. Note, however, that in the alternative, evaluating only certain objects and leaving other objects to a default implementation of the class is within the scope of the present invention. This particular way of selecting among multiple class implementations for only performance-sensitive or performance-critical objects would greatly speed up the compilation process. In short, the present invention extends to any method wherein a compiler automatically selects among alternative implementations of a class for at least one object in the computer program. By providing a mechanism whereby the compiler may automatically select among multiple class definitions for objects, the human decision between alternative implementations is removed, and the compiler may quickly and efficiently determine which implementation to use for a given object without the programmer manually analyzing and deciding which implementation to use. Thus, programming method 300 avoids or eliminates much of the repetitive iteration by the programmer illustrated in FIG. 2 to fine-tune his or her code.

Figure 4:
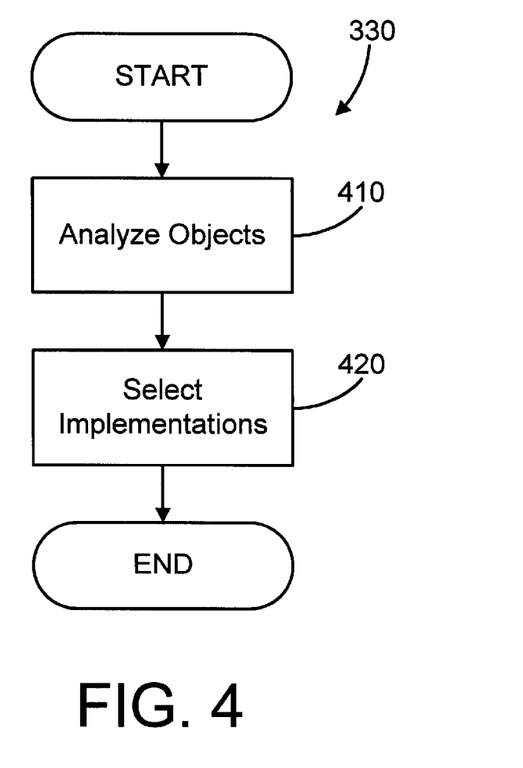
FIG. 4 is a flow diagram of one implementation of a portion of the compilation step 330 in FIG. 3.
Figure 9:
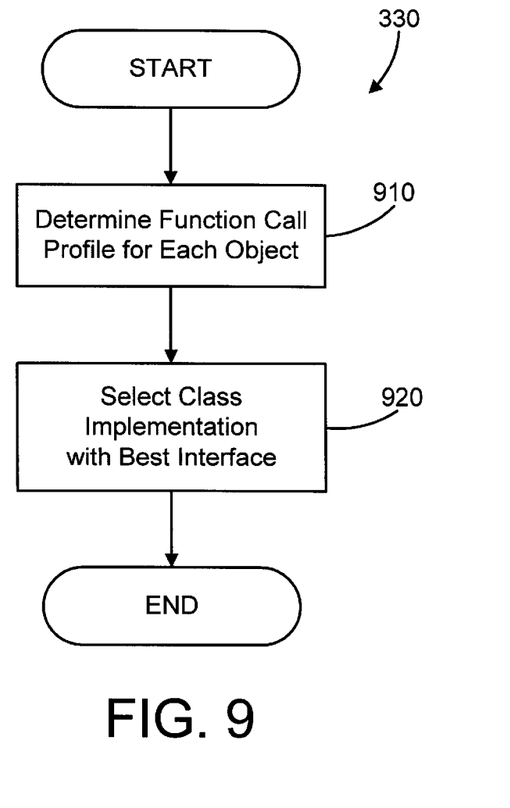
FIG. 9 is a flow diagram of an implementation of a portion of the compilation step 330 of FIG. 3 in accordance with a second embodiment of the present invention.

During the compilation step 330, the compiler may use many different criteria for selecting a particular class implementation for an object. The embodiments disclosed herein are illustrative of the concepts of the present invention, and as such, are not limiting. Two specific embodiments for selecting among multiple implementations of an object are discussed below, realizing that one skilled in the art may arrive at numerous other criteria for determining which implementation to use for a particular object. Referring to FIG. 4, in general, the preferred embodiments herein all perform the steps of analyzing the objects (step 410) and selecting an implementation for the objects (step 420) during compilation step 330. The flow diagram of FIGS. 4, 6, and 9 illustrate functions included during compilation step 330, recognizing that many other functions not shown or described are also performed during this step.

Figure 6:
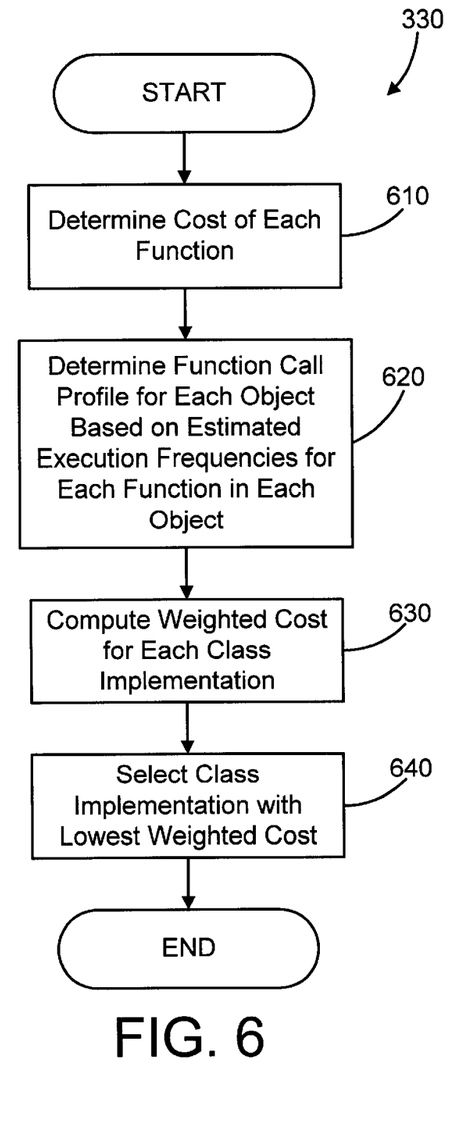
FIG. 6 is a flow diagram of an implementation of a portion of the compilation step 330 of FIG. 3 in accordance with a first embodiment of the present invention.

Referring now to FIG. 6, according to a first embodiment of the present invention, compilation step 330 selects among class implementations by generating a weighted cost function. Compilation step 330 suitably includes the steps of determining a cost for each function of the object (step 610), determining a function call profile for each object based on estimated execution frequencies (step 620), computing a weighted cost for each class implementation based on a numerical relationship between the cost and the function call profile for an object (step 630), and selecting the class implementation that has the lowest weighted cost (step 640). Each of these steps will be considered in turn.

The first step is to determine a cost for each function of an object (step 610). The cost for each function may be assigned by the implementor of the class, or may be generated heuristically by the compiler by statically analyzing the structure of the computer program. The cost of a function is suitably a measure of how the function compares in complexity, estimated execution speed, or other performance parameters, to other functions within the computer program. For example, the cost of a function may be related to the number and/or types of instructions used to implement the function, loop depth, etc. Whether the cost for each function is assigned by the class implementer or generated by a static analysis of the computer program, the cost for each function is stored in a memory (e.g., main memory 120 of FIG. 1) so the compiler 122 may access the cost information when needed. Note that the cost for a particular function in one class may be different from the cost for an identical function in a different implementation of the class.

Figure 5:
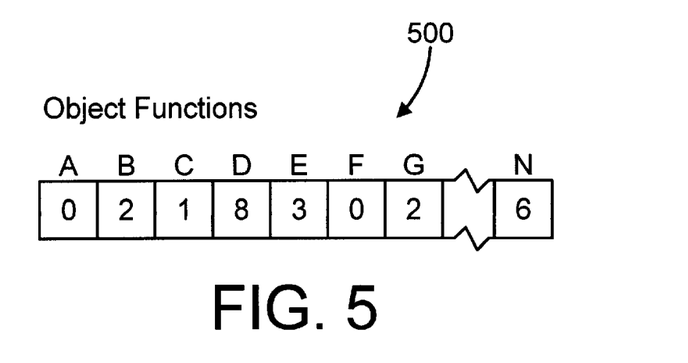
FIG. 5 is a schematic diagram of a count vector used to compile a function call profile for each object.

The next step is to determine a function call profile for each object (step 620). A function call profile is constructed by determining the set of functions in an object that are called within the program and estimating the number of times each is called. One specific method of constructing a function call profile uses a count vector 500 as shown in FIG. 5. Count vector 500 suitably comprises an integer list that contains a different list entry for each function of the object (e.g., functions A–N in FIG. 5). Each list entry contains an estimation of the number of times the corresponding function is called within the computer program. Thus, for the specific count vector 500 of FIG. 5, functions A and F are not called, function C is called once, functions B and G are called twice, function E is called three times, function N is called 6 times, and function D is called eight times. The function call profile (i.e., estimation of the number of calls issued against a particular function) may be derived from either a static (i.e., heuristic) analysis of the computer program, or may be derived from dynamic profiling data. As described above, such dynamic profiling data may be obtained by executing test code that includes instrumentation code on a processor 110 that will execute the final code generated by the compilation step 330, or by creating an address trace of the test code execution.

Figure 7:
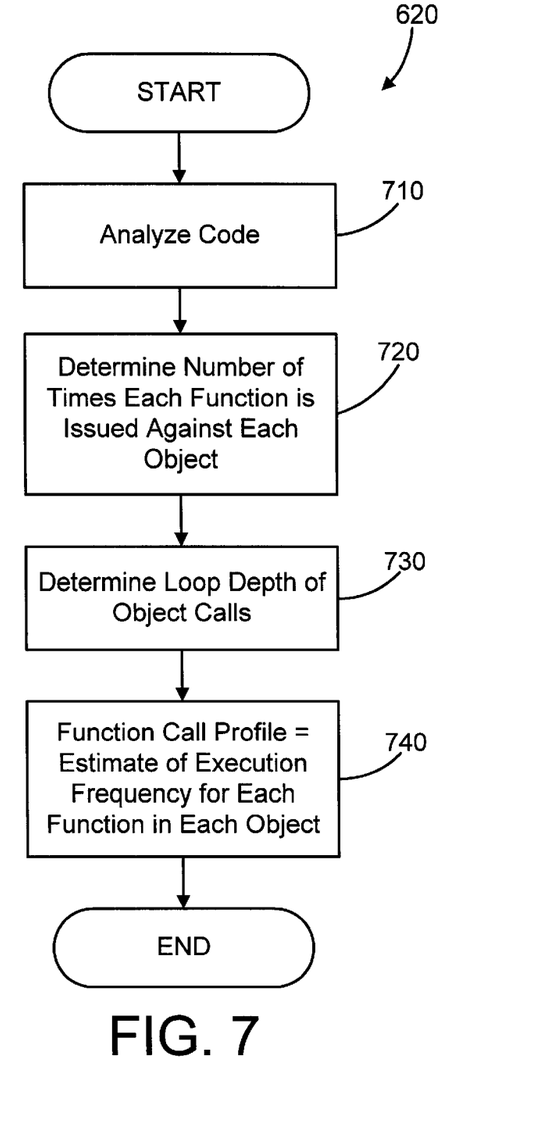
FIG. 7 is a flow diagram of one implementation of step 620 of FIG. 6 that statically analyzes the code to estimate execution frequencies of object functions.

One example of a suitable heuristic for constructing a function call profile is shown in FIG. 7. First, the compiler analyzes the code (step 710), and from this analysis determines the number of times each function is issued against each object (step 720), and the loop depth for the object calls (step 730). The function call profile is then computed (step 740), and represents an estimate of the frequency with which each function will be executed based on the data gathered above in steps 710, 720, and 730.

Figure 8:
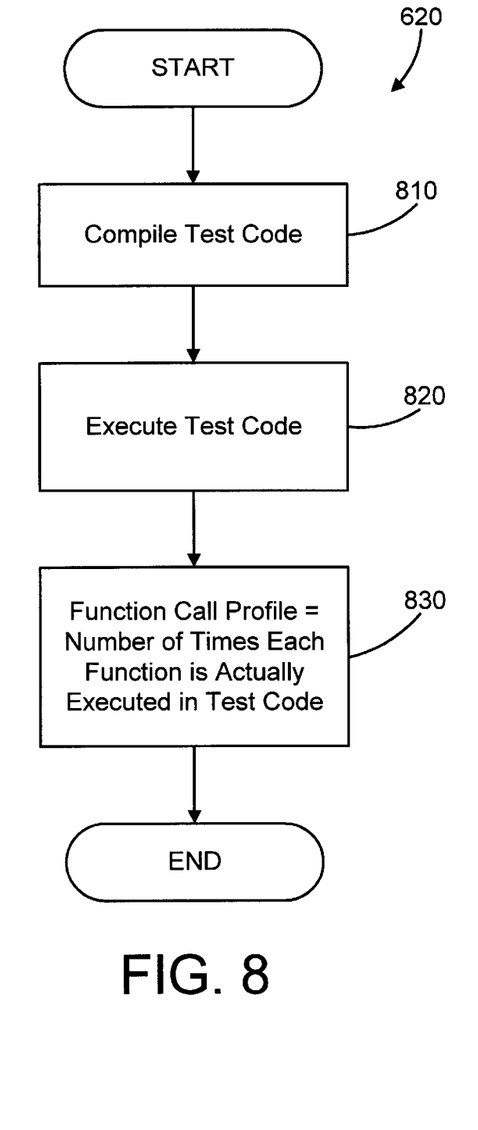
FIG. 8 is a flow diagram of a second possible implementation of step 620 of FIG. 6 that dynamically profiles test code to estimate execution frequencies of object functions.

A different method for determining a function call profile (step 620) uses dynamic profiling, as shown in FIG. 8. The test code is compiled (step 810), and run on a target platform (step 820) (i.e., a computer that has the same configuration as the computer of the anticipated user of the code). During execution of the test code, profile data is gathered as the code runs to track the number of times the test code actually executes each function in each object. This profile data may be acquired by any suitable technique, such as inserting instrumentation code or acquiring an address trace as the test code executes. The function call profile is set (step 830) to indicate the execution frequency of each function from the profile data. Note that if an object is passed to a procedure or other object outside the compilation unit (i.e., the group of objects currently being compiled), the number of all the functions for the object must be incremented by an appropriate amount, since the compiler does not know which of these functions will be used by the external procedure.

Whether the function call profile is determined by static analysis or by dynamic profiling, the resulting estimation of execution frequencies of functions (such as those represented in count vector 500 of FIG. 5) are stored in a memory (such as main memory 120 of FIG. 1) so compiler 122 may access the function call profile for each object.

Referring again to FIG. 6, the next step is, for each object, to compute a weighted cost for each class implementation (step 630). This step may be broken down into two substeps: 1) calculating the total weighted cost for each function in a class, and 2) numerically operating on each of the weighted costs within the class to arrive at a weighted cost for each class implementation. One suitable method for generating a total weighted cost for each function would take the cost of a function (e.g., from step 610) and multiply it with the corresponding estimated execution frequency for the function from the function call profile (e.g., from step 620) to arrive at a weighted cost (step 630) for each function. The weighted costs of the functions of an object may then be operated upon (e.g., added together) to arrive at an overall weighted cost for each class implementation. The final step is to select the class implementation with the lowest cost (step 640).

The scope of the first embodiment extends to both class implementations with identical interfaces and class implementations with different interfaces. An interface for an object instantiated under a class is the collective set of functions that can operate on the object data. For example, constraints may require a programmer to implement various classes with identical interfaces, which allows a direct comparison of weighted cost between different implementations. In the alternative, class implementations with different interfaces may still be compared using a weighted cost function as described above. However, a class may be considered as an implementation for an object only if it contains implementations for all functions required by the object. To ensure that at least one class is available to serve as an implementation for an object, at least one class must be defined which includes all the functions in all of the interfaces of the alternative class implementations. For purposes of discussion, such a class is said to have a full or complete interface.

The second embodiment in accordance with the present invention selects a class implementation for an object based on the functions in the interface rather than using a weighted cost function (as used in the first embodiment). This second embodiment assumes that the various class implementations have different interfaces, and is based on the property that, algorithmically, a programmer can often implement a subset of an interface more efficiently than the complete interface. Referring now to FIG. 9, the second embodiment uses a compilation step 330 that determines the function call profile for each object (step 910), and selects a class implementation for the object that has the "best interface" (step 920). One suitable definition of "best interface" is the interface that includes all the functions that the program will use and that contains the minimum number of unused functions.

One suitable method for constructing a function call profile (step 910) is using the same count vector 500 used in the first embodiment, which tracks the number of times a function is called in an object in the computer program. Once the function call profile is determined (step 910), the compiler then determines which functions have a zero count, indicating that these functions are not used by the computer program being compiled. The compiler then searches among the available alternative implementations of the class for the class that has an interface that includes all the functions used (as indicated by non-zero counts in count vector 500), and that has a minimum of unused functions (as indicated by zero counts in count vector 500). Such an implementation is said to have the "best interface" (or most efficient interface), and the implementation with the best interface is selected (step 920).

An alternative way of determining the function call profile (step 910) uses a bit vector similar to count vector 500, but rather than containing integer values to count the number of times a function is called, a suitable bit vector contains one binary digit for each function that is set to one state (e.g., one) if the function is called by the computer program being compiled, and that is set to the other state (e.g., zero) if the function is not called. The compiler may then operate on this bit vector in the same manner as for count vector 500 above, selecting a class implementation (step 920) that contains all the functions that are non-zero in the bit vector and that contains a minimum of functions that are zero in the bit vector.

For both embodiments described herein, whether the function call profile uses a count vector (e.g., 500) or a bit vector (or a different mechanism), if the object is passed to a procedure external to the compilation unit, all of the functions are incremented (for the count vector) or set (for the bit vector). The result of passing the object to an external procedure is that the compiler must presume that all functions of the object are used, since the compiler typically will not know which functions are being used by the external procedure. Likewise, if the compiler analysis fails to determine exactly which methods are used for a particular object, the compiler must presume that all functions are used. As a result, any object for which the compiler cannot determine which methods are used must contain the full interface. This attribute may simplify the process of selecting among multiple implementations for an object, since all objects that are passed to external procedures will select only among one or more class implementations that have the full interface. Note that this problem may be avoided if a compiler in accordance with the present invention is designed with the capability of performing inter-modular or inter-procedural analyses, allowing the compiler to track usage of object functions across compilation units.

The invention as disclosed herein provides a significant improvement to the performance of a computer program by allowing a compiler to automatically select the most efficient implementation of an object by selecting among multiple classes for the object. When this capability is provided within a compiler, the programmer no longer needs to manually analyze the performance of objects and manually select an alternative implementation. By selecting the most efficient implementation of one or more objects in the computer program, the compiler automatically produces code that has significantly higher performance than prior art compiler-generated code.

It is important to note that while the present invention has been described herein in the context of a fully functional computer system, those skilled in the art will appreciate that the present invention is capable of being distributed as a program product via floppy disk, CD-ROM, or other form of recordable media or via any type of electronic transmission mechanism.

While the invention has been particularly shown and described with reference to preferred exemplary embodiments thereof, it will be understood by those skilled in the art that various changes in form and details may be made therein without departing from the spirit and scope of the invention.

What is claimed is:

1. A computer apparatus comprising:
   a processing unit, the processing unit executing a first instruction stream;
   a compiler, the compiler generating the first instruction stream from an object oriented instruction stream, the compiler including:
      an implementation selector, the implementation selector automatically selecting according to at least one predetermined criterion which of a plurality of pre-existing implementations for at least one object oriented object in the object oriented instruction stream is used to generate the first instruction stream.

2. The computer apparatus of claim 1 wherein the predetermined criterion includes a weighted cost function corresponding to each of the plurality of implementations of the object, wherein the implementation selector selects the implementation for the object that has the lowest weighted cost.

3. The computer apparatus of claim 2 wherein the weighted cost function comprises a numerical relationship between a cost of each object oriented function for each of the plurality of implementations of the object and a corresponding function call profile for each of the plurality of implementations, wherein the function call profile includes an estimate of the frequency of execution for each object oriented function as the first instruction stream is executed on the processing unit.

4. The computer apparatus of claim 2 wherein the weighted cost function for each of the plurality of implementations is derived heuristically by the compiler according to the attributes of one of the first and object oriented instruction streams.

5. The computer apparatus of claim 2 wherein the weighted cost function for each of the plurality of implementations is derived by using dynamic profiling information acquired by running a portion of test code on the processing unit, the test code being designed to simulate the performance of the first instruction stream.

6. The computer apparatus of claim 1 wherein each object includes at least one object oriented function, and wherein the implementation selector selects which of the plurality of implementations is used to generate the first instruction stream according to which object oriented functions are issued against the object.

7. The computer apparatus of claim 6 wherein the implementation selector selects one of the plurality of implementations that contains all of the functions that are issued against the object.

8. The computer apparatus of claim 7 wherein the selected implementation further contains the fewest functions that are not issued against the object.

9. A computer apparatus, the computer apparatus generating a first instruction stream executable on a processing unit from an object oriented instruction stream, the computer apparatus comprising:
   an implementation selector, the implementation selector automatically selecting at compile time according to at least one predetermined criterion which of a plurality of pre-existing implementations for at least one object oriented object in the object oriented instruction stream is used to generate the first instruction stream.

10. The computer apparatus of claim 9 wherein the predetermined criterion includes a weighted cost function corresponding to each of the plurality of implementations of the object, wherein the implementation selector selects the implementation for the object that has the lowest weighted cost.

11. The computer apparatus of claim 9 wherein each object includes at least one object oriented function, and wherein the implementation selector selects which of the plurality of implementations is used to generate the first instruction stream according to which object oriented functions are issued against the object.

12. A program product comprising:
   a recordable media; and
   a compiler recorded on the recordable media, the compiler being used to generate a first instruction stream from an object oriented instruction stream, the compiler including:
      an implementation selector, the implementation selector automatically selecting according to at least one predetermined criterion which of a plurality of pre-existing implementations for at least one object oriented object in the object oriented instruction stream is used to generate the first instruction stream.

13. The program product of claim 12 wherein the predetermined criterion includes a weighted cost function corresponding to each of the plurality of implementations of the object, wherein the implementation selector selects the implementation for the object that has the lowest weighted cost.

14. The program product of claim 12 wherein each object includes at least one object oriented function, and wherein the implementation selector selects which of the plurality of implementations is used to generate the first instruction stream according to which object oriented functions are issued against the object.

15. A program product comprising:
   a recordable media; and
   a compiler recorded on the recordable media, the compiler being used to generate a first instruction steam for a processing unit from an object oriented instruction stream, the compiler including:
      an implementation selector, the implementation selector automatically selecting according to at least one predetermined criterion which of a plurality of pre-existing implementations for at least one object oriented object in the object oriented instruction stream is used to generate the first instruction stream according to a weighted cost function corresponding to each of the plurality of implementations of the object, the weighted cost function for each of the plurality of implementations being determined from dynamic profiling information acquired by running a portion of test code on the processing unit, the test code being designed to simulate the performance of the first instruction stream, the weighted cost function representing an estimate of the frequency of execution for each object oriented function as the first instruction stream is executed on the processing unit, and wherein the implementation selector selects the implementation for the object that has the lowest weighted cost.

16. A compiler method for generating a first instruction stream from an object oriented instruction stream and for optimizing the performance of a processing unit that executes the first instruction stream, the method including the step of:
   automatically selecting according to at least one predetermined criterion which of a plurality of pre-existing implementations for at least one object oriented object in the object oriented instruction stream is used to generate the first instruction stream.

17. The compiler method of claim 16 wherein the predetermined criterion is determined by performing the step of:
   deriving a weighted cost function corresponding to each of the plurality of implementations of the object, wherein the implementation selector selects the implementation for the object that has the lowest weighted cost.

18. The compiler method of claim 17 wherein the weighted cost function for each of the plurality of implementations is derived heuristically by the compiler according to the attributes of one of the first and object oriented instruction streams.

19. The compiler method of claim 17 wherein the weighted cost function for each of the plurality of implementations is derived by using dynamic profiling information acquired by running a portion of test code on the processing unit, the test code being designed to simulate the performance of the first instruction stream.

20. The compiler method of claim 17 wherein the test code comprises an object code output from an initial compilation of the object oriented instruction stream, the object code output including instrumentation code to generate the dynamic profiling information.

21. The compiler method of claim 16 further including the steps of:

determining a cost function for each of the plurality of implementations;

determining a function call profile for each of the plurality of implementations, the function call profile including an estimate of the frequency of execution for each object oriented function as the first instruction stream is executed on the processing unit;

weighting the cost function with the function call profile for each implementation to arrive at a weighted cost function for each of the plurality of implementations; and selecting the implementation for the object that has the lowest weighted cost.

22. The compiler method of claim 16, wherein each object includes at least one object oriented function, and wherein the step of automatically selecting which of the plurality of implementations is used to generate the first instruction stream includes the steps of:

determining which object oriented functions are issued against the object; and selecting one of the implementations that contains all the object oriented functions that are issued against the object.

23. The compiler method of claim 22 wherein the selected implementation further contains the fewest object oriented functions that are not issued against the object.

24. A method for distributing a program product comprising the steps of:

initiating a connection between a first computer system and a second computer system;

transmitting the program product from the first computer system to the second computer system, the program product being a compiler, the compiler being used to generate a first instruction stream from an object oriented instruction stream, the compiler including an implementation selector for automatically selecting according to at least one predetermined criterion which of a plurality of pre-existing implementations for at least one object oriented object in the object oriented instruction stream is used to generate the first instruction stream.

25. A method for programming a computer comprising the steps of:

providing a compiler, the compiler generating a first instruction stream from an object oriented source code instruction stream;

providing a plurality of implementations for at least one object oriented object to the compiler;

writing the source code instruction stream in an object oriented language requiring compilation by the compiler;

compiling the object oriented source code instruction stream using the compiler, the compilation step including the step of:

automatically selecting which of the plurality of implementations for at least one object oriented object in the object oriented source code instruction stream is used to generate the first instruction stream according to an estimation of execution frequencies of object oriented functions associated with the object.

26. The method of claim 25 further comprising the steps of:

precompiling the source code instruction stream to produce a test code instruction stream;

executing the test code instruction stream on a computer system similar to that anticipated for executing the first instruction stream;

acquiring profiling information relating to the execution frequencies of each function of each object;

providing the profiling information to the compiler;

wherein the step of automatically selecting among the plurality of implementations includes the step of selecting one of the plurality of implementations based on the profiling information.

27. The method of claim 26 further comprising the step of inserting instrumentation code into the test code instruction stream to measure the performance of the test code instruction stream during the executing step, and wherein the step of acquiring profiling information includes the step of deriving the profiling information from the results provided by the instrumentation code.

28. The method of claim 26 wherein the step of acquiring profiling information includes the steps of:

collecting an address trace during the step of executing the test code instruction stream; and deriving the profiling information from the results provided by the address trace.

29. The method of claim 25 wherein each object includes at least one object oriented function, and wherein the step of automatically selecting which of the plurality of implementations is used to generate the first instruction stream includes the steps of:

determining which object oriented functions are issued against the object; and selecting one of the implementations that contains all the object oriented functions that are issued against the object.

* * * * *

UNITED STATES PATENT AND TRADEMARK OFFICE
CERTIFICATE OF CORRECTION

PATENT NO.   : 6,360,360 B1                                              Page 1 of 1
DATED        : March 19, 2002
INVENTOR(S)  : Cary Lee Bates, Edward Curtis Prosser and William Jon Schmidt It is certified that error appears in the above-identified patent and that said Letters Patent is hereby corrected as shown below:

<u>Column 14,</u>
Line 20, after "selecting" delete "among".
Line 20, after "selecting" insert -- which of --.
Line 21, after "implemetations" insert -- is used to generate the first instruction stream --.

Signed and Sealed this

Twenty-second Day of October, 2002

Attest:

Attesting Officer

JAMES E. ROGAN
*Director of the United States Patent and Trademark Office*